UNITED STATES PATENT OFFICE.

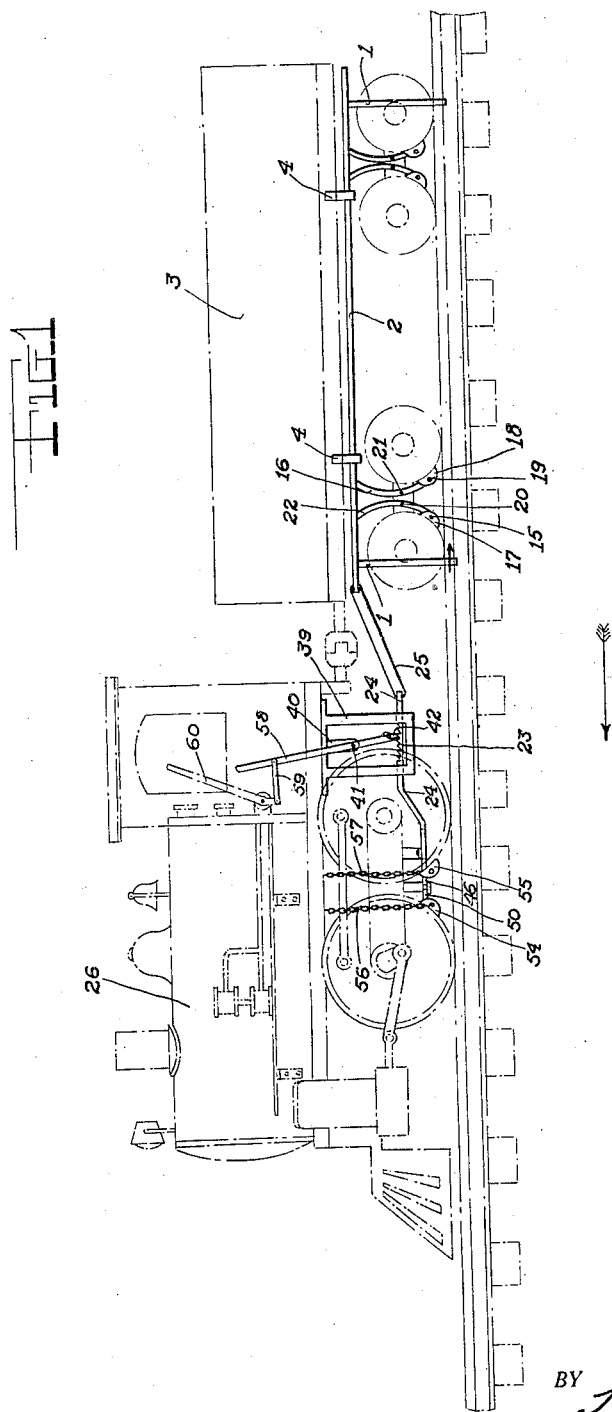

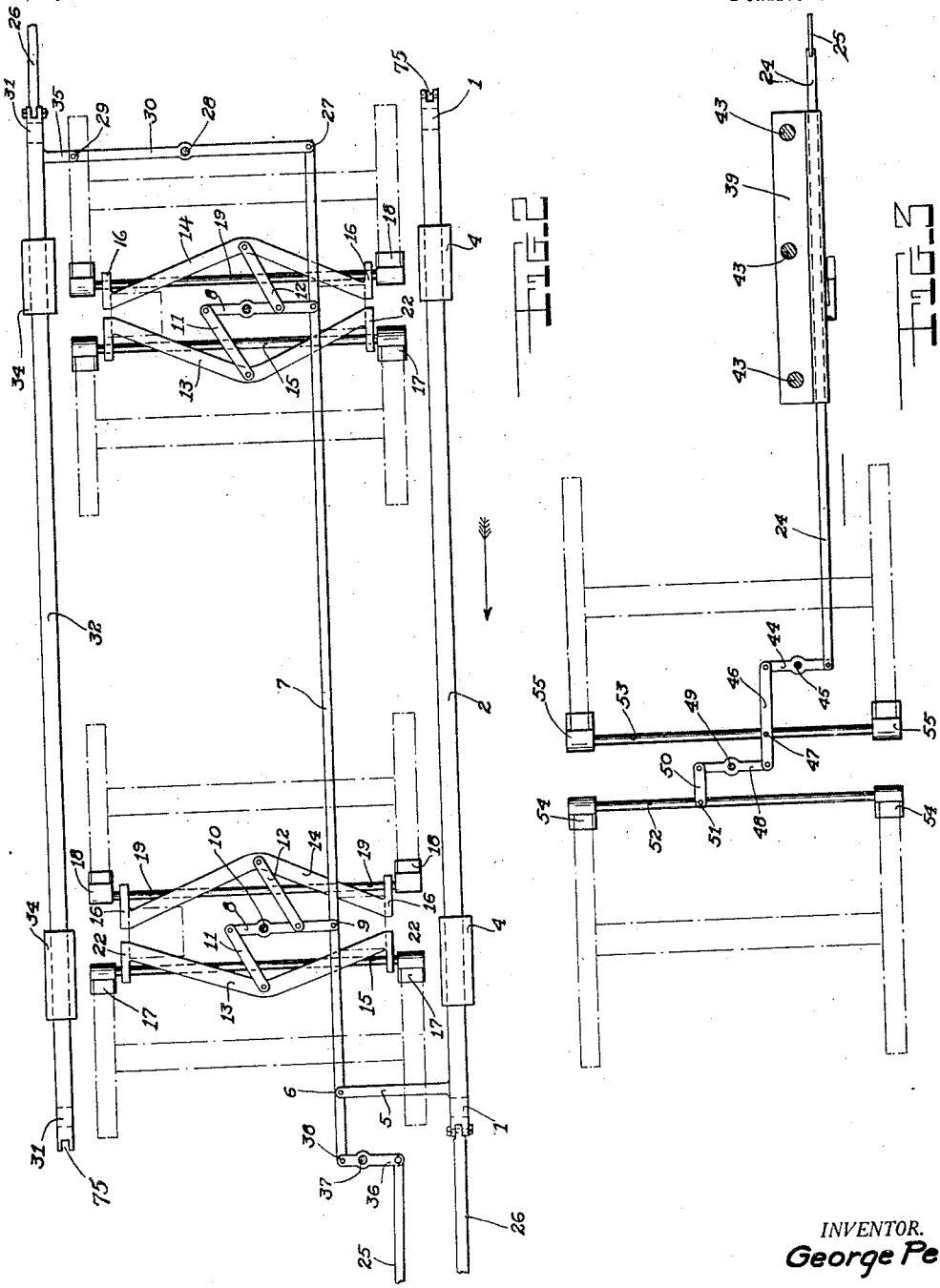

GEORGE PETRO, OF BEAVER FALLS, PENNSYLVANIA.

SAFETY DEVICE FOR RAILROADS.

1,358,242.　　　　Specification of Letters Patent.　　Patented Nov. 9, 1920.

Application filed December 4, 1919. Serial No. 342,524.

*To all whom it may concern:*

Be it known that I, GEORGE PETRO, citizen of Hungary, and resident of Beaver Falls, in the county of Beaver and State of Pennsylvania, have invented certain new and useful Improvements in Safety Devices for Railroads, of which the following is a specification.

This invention relates to safety devices for railroad trains and especially to those designed to act in case of the derailment of the train.

The object of this invention is the provision of simple, efficient and positive automatic means for stopping the train quickly in case any of the cars should leave the track.

A further object of this invention is the provision of means, which besides automatically setting the brakes on the cars, will in addition, automatically set the brakes on the locomotive and close the throttle thereon.

For the accomplishment of the aforesaid objects, I employ the devices shown in the accompanying drawings, in which—

Figure 1 is a diagrammatic elevation showing my improved mechanism attached to a locomotive and to a car.

Fig. 2 is a plan of my invention as it appears when attached to a car, and Fig. 3 is a plan of the mechanism for automatically setting the brakes on the locomotive.

In the practical embodiment of my invention, a feeler 1, preferably vertical, the lower extremity of which just clears the road-bed, is joined to bar 2 in such a manner that it may readily be swung out of operative position, by means of a strong hinge joint of the usual type not shown. The feelers 1 are opened out to the position shown in Fig. 1 when the car runs in the direction of the arrow. Said bar 2 is positioned longitudinally of the train, and is supported from car 3 by suitable brackets 4. Arm 5 is attached to bar 2, Fig. 2, and is secured to the long connection 7 at joint 6. The device for setting the brakes comprises crank lever 8 attached to connection 7, at joint 9 and pivoted on stationary stud 10, links 11 and 12 attached to crank lever 8 on opposite sides of stud 10, and attached respectively to bent brake shaft supports 13 and 14. Said brake shaft supports 13 and 14 have curved arms 22 and 16 respectively thereon, which arms are pivoted at 20 and 21 respectively, Fig. 1, and support brake shafts 15 and 19 respectively. Brake shaft 15 has mounted on the ends thereof brake-shoes 17, while brake shaft 19 has similar brake-shoes thereon. For operating the car brakes when the car runs in a direction opposite to that shown by the arrows in Figs. 1 and 2, bar 32 and feelers 31 constructed similarly to bar 2 and feelers 1, are used.

Said bar 32 is supported by the brackets 34 from the other side of car 3, Fig. 2, and has arm 35 attached thereto. Said arm 35 is attached at its other end to lever 30 at joint 29. Said lever 30 is pivoted on stud 28 and is attached to long connection 7 at joint 27 so that motion of bar 32 in a direction opposite to that of the motion of bar 2, will have the same effect on the braking mechanism. Link bars 26 are attached to one end of bars 2 and 32 for connection with that end of said bars on the preceding and succeeding cars to which no link bar is attached so that movement of a bar on any of the cars will set the brakes on all, an opening 75 being provided in the rear ends of bars 2 and 32 in which said link bars 26 may be suitably fastened.

Lever 36, pivoted about stud 37, is attached at one end to long connection 7 at joint 38. Connecting bar 25 connects the other end of lever 36 to link rod 24 having ratchet teeth 23 cut therein, which teeth are engaged by pawl 42 attached to lever 58. Frame 39 is suitably attached to the locomotive as by bolts 43 and has bracket 40 attached thereto in which said lever 58 is pivotally supported. The connection to the throttle valve of the locomotive is made by link 59 connecting the upper end of lever 58 with throttle lever 60, Fig. 1.

For connecting link rod 24 to the locomotive brakes, lever 44 pivoted in stud 45 is attached at one end to rod 24 and at the other end to link 46 which is fastened to brake shaft 53 at joint 47, said shaft carrying brake shoes 55 at its extremities. To operate brake shaft 52 on the ends of which are brake-shoes 54, link 50 is joined at one end to said shaft 52 at joint 51, the other end being connected to lever 48, which is pivoted on stud 49, said brakes being suspended by means of the usual chains as 56 and 57.

The operation of my improved mechanism is as follows:

It being assumed that the train is traveling in the direction of the arrow in Fig. 1, feelers 1 are placed in their operative position, and link bars 26 of each car connected to bars 2 of the preceding car. If the train or any car thereof is run in the opposite direction, feelers 1 are first swung out of the way, then feelers 31 placed into operative position. Should derailment occur, said feelers, which ordinarily clear the road-bed come into violent contact with the ground and tend to stick or jam therein, while the train moves on. Under these circumstances, the feelers and the bars connected thereto are given a backward motion of the train, so that said bars move backward in brackets 4, operating the various lever connections and links 5, 7, 8, 11 and 13 to throw on the brakes 17 and 18, not only on the derailment car but also on all the cars in the train through link bars 26. At the same time, the brakes 54 and 55 of the locomotive, and throttle lever 60 are operated through chain 25, levers and links 24, 44, 46, 48, 50, 58, and 59 to set the brakes and close the throttle.

In case of necessity, by pulling the upper end of lever 58 inside the locomotive cab by hand, the result as above described is obtained, whereby the brakes on all the cars and in the locomotive are set and the throttle closed in one operation and by one motion.

What I claim is:

1. In a railroad safety device, the combination with a train of cars of a feeler for detecting derailment of a car, a horizontal bar arranged longitudinally of the train to which said feeler is attached, brakes on said cars, and means for operatively connecting said bar and feeler with said brakes for automatically setting said brakes on the derailment of a car.

2. In a railroad safety device, the combination with locomotive and a train of cars of a feeler for detecting derailment of a car, a horizontal bar arranged longitudinally of the train to which said feeler is attached, brakes on said cars, means for operatively connecting said brakes with said feeler for automatically setting said brakes on the derailment of a car, and means connected with the throttle lever of the locomotive for closing said throttle on the derailment of a car.

3. The combination with a locomotive and a train of cars of means for detecting derailment of a car, and means operated by said derailment detecting means for automatically braking said cars and locomotive and for automatically closing the throttle of said locomotive on the derailment of a car.

4. The combination with a locomotive and a train of cars of means for detecting derailment of a car, means operated by said derailment detecting means for automatically braking said cars and locomotive and for closing the throttle of said locomotive on said derailment, and a lever connected with said braking and throttle closing means for braking said cars and locomotive and for closing said throttle manually in one operation.

Signed at Beaver Falls, in the county of Beaver and State of Pennsylvania this first day of December A. D. 1919.

GEORGE PETRO